United States Patent [19]

Takada

[11] Patent Number: 4,690,234
[45] Date of Patent: Sep. 1, 1987

[54] STABILIZING MEANS FOR SNOWMOBILE

[75] Inventor: Kazuyoshi Takada, Iwata, Japan

[73] Assignee: Yamaha Hatsudoki Kabushiki Kaisha, Iwata, Japan

[21] Appl. No.: 850,985

[22] Filed: Apr. 11, 1986

[51] Int. Cl.⁴ .................. B62B 13/08; B62B 17/04
[52] U.S. Cl. .................... 180/182; 180/190; 267/273; 280/21 R; 280/665; 280/689
[58] Field of Search ............ 180/182, 190; 280/21 R, 280/689, 665; 267/154, 21 A, 20 A, 57 R, 15 R

[56] References Cited

U.S. PATENT DOCUMENTS

| Re. 28,423 | 5/1975 | Higginbotham | 280/21 A |
|---|---|---|---|
| 2,660,449 | 11/1953 | MacPherson | 280/665 |
| 3,075,600 | 1/1963 | Ordorica et al. | 180/256 |
| 3,504,752 | 4/1970 | Milward | 180/190 |
| 3,613,812 | 10/1971 | Hetteen | 280/25 |
| 3,674,103 | 7/1972 | Kiekhaefer | 180/190 |
| 3,762,487 | 10/1973 | Bilas | 280/81 R X |
| 3,835,947 | 9/1974 | Alexander, Jr. | 280/21 R |
| 3,900,208 | 8/1975 | Hjelmquist | 280/16 |
| 3,931,862 | 1/1976 | Cote | 280/21 R |
| 4,143,729 | 3/1979 | West et al. | 280/21 R |
| 4,372,567 | 2/1983 | Yasui et al. | 180/182 X |
| 4,422,657 | 12/1983 | Swanson | 280/21 R |
| 4,489,954 | 12/1984 | Yasui et al. | 280/21 R |
| 4,509,766 | 4/1985 | Yasui et al. | 280/21 R |

FOREIGN PATENT DOCUMENTS 1000313 3/1983 U.S.S.R. .................. 280/689

Primary Examiner—John J. Love
Assistant Examiner—Mitchell J. Hill
Attorney, Agent, or Firm—Ernest A. Beutler

[57] ABSTRACT

A improved stabilizer construction for a snowmobile wherein the front skis are supported for suspension movement and for steering by means of a scissors type link. The stabilizing arrangement includes a torsion bar that is affixed for rotation with the pivotal connection of the scissors linkage to the steering arm of the front skis.

9 Claims, 4 Drawing Figures

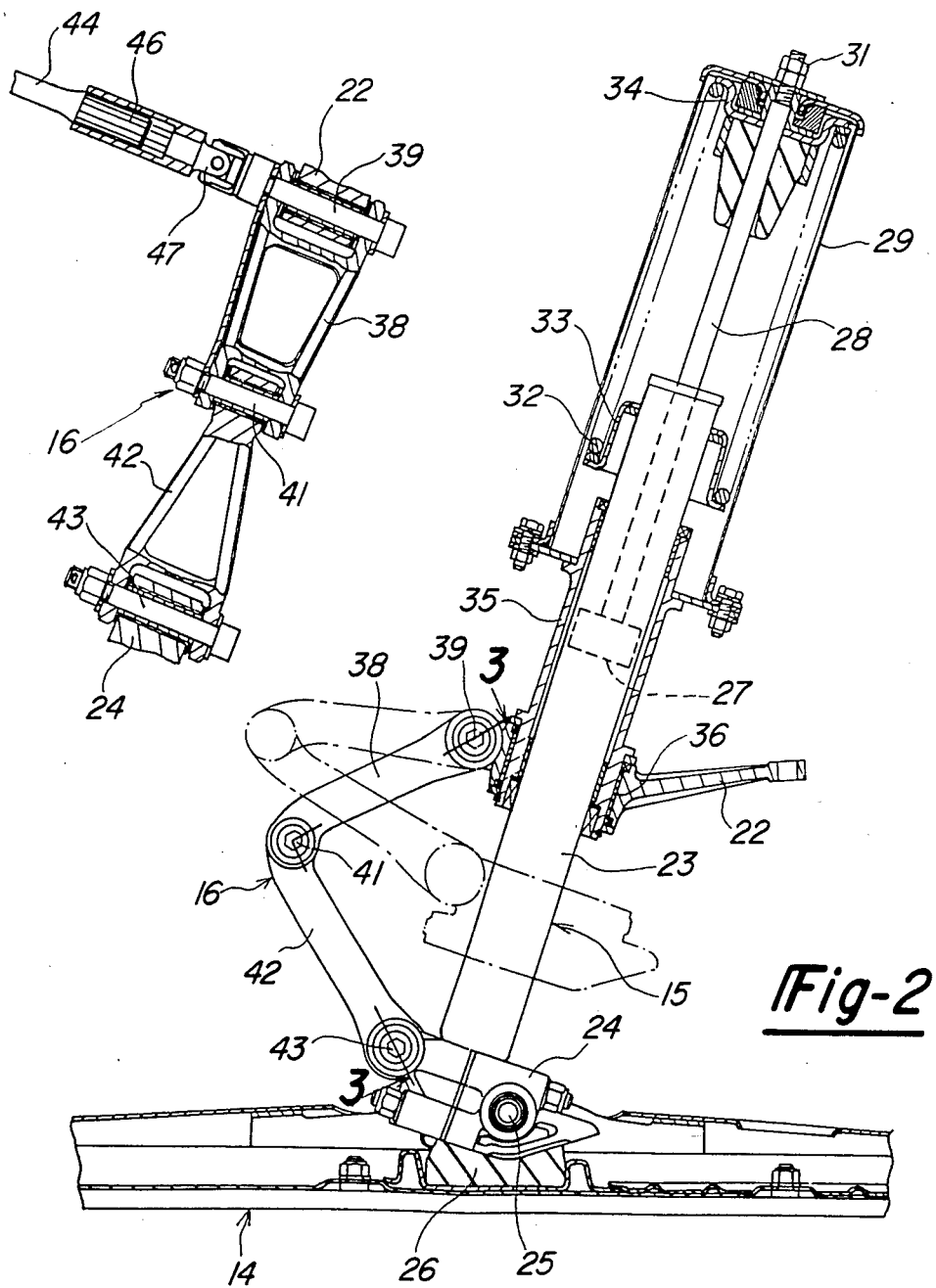

STABILIZING MEANS FOR SNOWMOBILE

BACKGROUND OF THE INVENTION

This invention relates to a stabilizing arrangement for a snowmobile and more particularly to an improved stabilizer bar for the front suspension of such a vehicle.

As is well known, it is the common practice to suspend the skis of a snowmobile independently by means of respective strut type suspensions. It is also desirable to provide some form of stabilizer or sway bar arrangement interconnecting the front skis so as to produce the amount of leaning as may occur under cornering conditions. Because of the rough uneven and, at times, uncertain terrain over which a snowmobile is ridden, it is desirable that the stabilizer arrangement be positioned so that it will be protected and, more importantly, so that it will protect the more critical components of the snowmobile and its suspension if unexpected objects are encountered. In addition, it is desirable to position the stabilizer bar in such a way that it will not add to the unsprung weight of the vehicle. However, with the type of stabilizer arrangements previously employed for snowmobiles, these objects are not easily met.

It is, therefore, a principal object of this invention to provide an improved stabilizer arrangement for a snowmobile suspension.

It is another object of the invention to provide a stabilizer for a snowmobile ski suspension that will be well protected and will protect the other components of the snowmobile suspension.

SUMMARY OF THE INVENTION

This invention is adapted to be embodied in a suspension system for a snowmobile or the like that comprises a pair of skis. A suspension system is provided for suspending each of the skis for independent suspension movement relative to the snowmobile. Each suspension comprises a pair of links pivotally connected to each other and in which one of the links is pivotally connected to the snowmobile and the other of the links is pivotally connected to the respective ski. In accordance with the invention, a torsion bar extends between the suspension systems. Means fix one end of the torsion bar for rotation about one of the link pivot axes upon suspension movement of the respective ski. Means fix the other end of the torsion bar for rotation about the corresponding link axis of the other ski for rotation of the other end about the other link axis upon suspension movement of the other ski.

BRIEF DESCRIPTION OF THE DRAWINGS

FIG. 2 is an enlarged, side elevational view showing the suspension system of one of the skis.

FIG. 3 is a cross-sectional view taken along the line 3—3 of FIG. 2.

DETAILED DESCRIPTION OF THE PREFERRED EMBODIMENT

Figure 1:
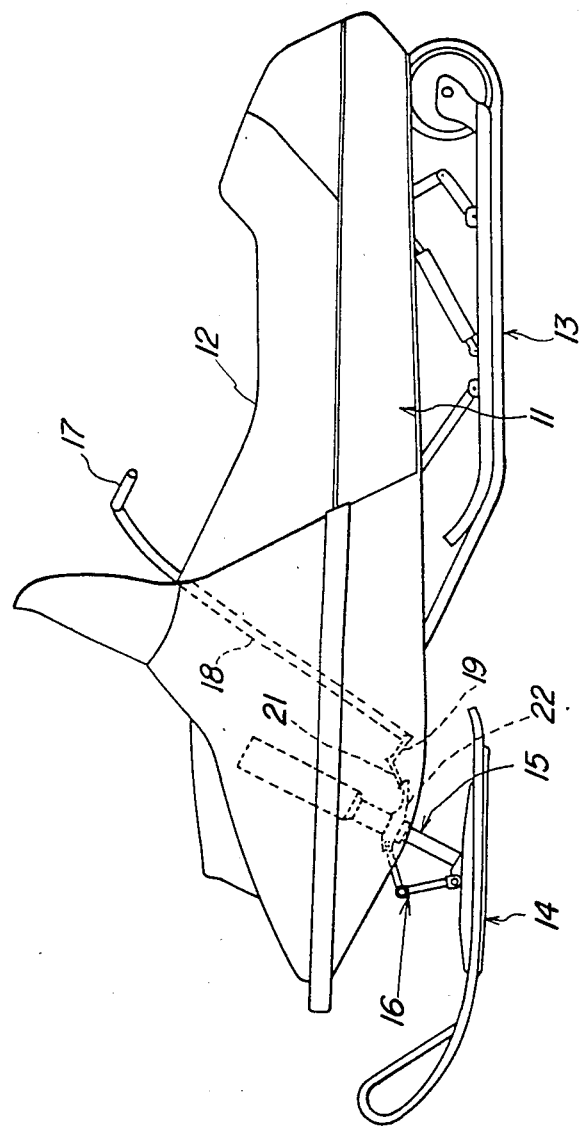
FIG. 1 is a side elevational view of a snowmobile having a suspension system constructed in accordance with an embodiment of the invention.

Referring first to FIG. 1, a snowmobile constructed in accordance with an embodiment of the invention is identified generally by the reference numeral 11. The snowmobile 11 includes a body 12 from which is suspended a driving track 13. The track 13 is driven and suspended in any suitable manner and since this arrangement forms no part of the invention, a further discussion of it is not believed to be necessary.

At the front end of the body 12, there are provided a pair of steered front skis 14. Each of the skis 14 is suspended for suspension and steering movement relative to snowmobile body 12 by means of a strut arrangement 15 including a scissors linkage 16.

The front skis 14 are steered by means of a handlebar 17 having a steering shaft 18 that is journaled in the body 12 in a known manner. A Pitman arm 19 is connected to the lower end of the steering shaft 18 and cooperates with a drag link 21 for steering a steering arm 22 that is affixed to one front ski 14 in a manner now to be described.

Referring now primarily to the remaining figures, it will be seen that each strut 15 comprises a cylinder 23 that is fixed, by means of a bracket 24 to the front ski 14. The bracket 24 is connected to the ski 14 by means of a pivot pin 25 so as to permit some limited pivotal movement of the ski 14 relative to the cylinder 23 about the axis of the pivot pin 24. A rubber damper 26 is interposed between the ski 14 and bracket 24 so as to limit this pivotal movement. The ski 14 is, however, affixed against steering movement relative to the cylinder 23 by the bracket 24 and pivot pin 25.

The cylinder 23 is formed with an internal chamber that is filled with hydraulic fluid and a shock absorber piston 27 is received within this internal chamber. A piston rod 28 is affixed to the piston 27 and extends upwardly through the upper end of the cylinder 23 where it is appropriately sealed. The piston rod 28 is affixed, as by a nut assembly 31, to a spring tower 29 that is formed in the body of the snowmobile in a known manner.

Contained within the spring tower 29 is a coil compression spring 32 which acts against a first spring stop 33 that is affixed for axial movement with the cylinder 23 and a second spring stop 34 that is affixed to the spring tower 29 and body. Hence, vertical movement of the ski 14 will cause reciprocation of the cylinder 23 relative to the piston rod 28 to provide hydraulic damping. At the same time, the spring 32 will be loaded by the movement of the spring stop 33.

Figure 4:
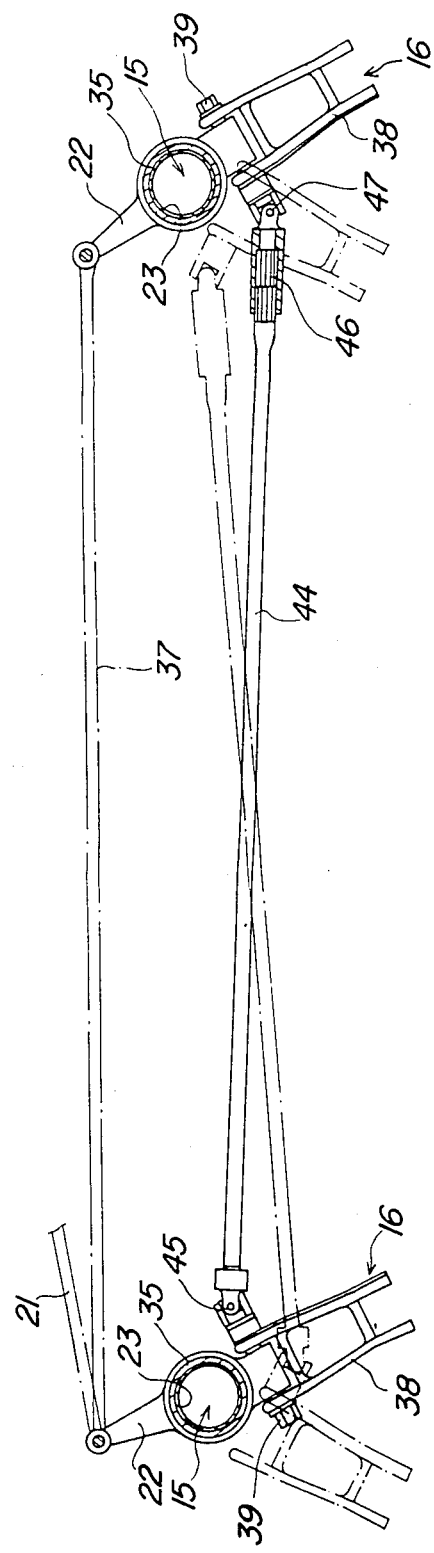
FIG. 4 is a top plan view, with portions broken away, showing the suspension system and stabilizer operation during steering movement.

A cylindrical extension 35 of the body 12 is fixed relative to the spring tower 29 and extends downwardy and surrounds the cylinder 23. The steering arm 22 is journaled upon the lower end of the extension 35 by means of a bushing 36. It should be noted that the drag link 21 is connected to only one of the steering arms 22 (FIG. 4). The two steering arms 22 are connected to each other by means of a tie rod 37 so that both skis 14 will be steered in unison, as is well known in this art.

The scissors linkage assembly 16 serves the combined function of controlling the suspension movement of the ski 14 permitted by the strut 15 and also for holding the ski 14 against rotation relative to the steering arm 22 and for steering the front ski 14 upon rotation of the steering arm 22. It should be noted that the scissors linkage assembly 16 is positioned forwardly of the strut 15 and hence it will protect the strut from damage if unexpected obstacles are encountered.

The scissors linkage assembly 16 includes a first, upper link 38 that is pivotally connected at its upper end to the steering arm 22 by means of a pivot pin 39. It should be noted that the pivot pin 39 is appropriately fixed to the link 38 so that it will rotate with the link 38 upon suspension travel, for a reason to be described. The means for so affixing the pin 39 to the link 38 may take any form.

At its lower end, the link 38 is connected to a pivot pin 41 which is, in turn, pivotally connected to the upper end of a lower link 42. The lower link 42 has its lower end pivotally connected to the bracket 24 by means of a pivot pin 43.

It should be readily apparent from the foregoing description that suspension movement of the front skis 14 will cause the scissors linkage assembly 16 to pivot as shown in the phantom line view of FIG. 2. The pivotal connections 39, 41 and 43 and the operation of the links 38 and 42 preclude rotation of the ski 14 relative to the steering arm 22 and vice versa.

A stabilizer bar in the form of an elongated torsion bar 44 extends between the steering arm 22 associated with each front ski 14 and is affixed to the scissors linkage system 16 for torsional loading upon suspension movement of one ski so as to reduce leaning. At one end, the torsion bar 44 is affixed for rotation with the pivot pin 39 by means of a universal joint 45. The universal joint 45 accommodates the steering movement of the front skis as clearly shown in FIG. 4. At the other end, the torsion bar 44 is splined as at 46 so as to be connected to a second universal joint 47 which nonrotatably couples this end of the torsion bar 44 to the pivot pin 39 of the link 38 of the suspension for the other ski 14. The splined connection 46 accommodates changes in length as may occur during suspension and steering movements.

It should be noted that the torsion bar 44 is positioned at the upper lower edge of the snowmobile body 12 and hence will protect the underside of the body and the steering mechanism if unexpected objects are encountered. In addition, since the torsion bar 44 is carried by the body 12, although rotatable and pivotal relative to it, it forms a sprung portion of the snowmobile and thus the unsprung weight is reduced from prior art constructions.

It should be readily apparent that a relatively simple and highly effective stabilizer bar arrangement has been illustrated and described which has an uncomplicated connection to the front skis, which does not add to the unsprung weight and which is protected and serves to protect the front suspension. Although an embodiment of the invention has been illustrated and described, various changes and modifications may be made without departing from the spirit and scope of the invention, as defined by the appended claims.

What is claimed is:

1. In a suspension system for a snowmobile or the like comprising a pair of skis, suspension means for suspending each of said skis for suspension movement relative to said snowmobile, each suspension system comprising a pair of links, the links of each of said pair of links being pivotally connected to each other about a first pivot axis, means for pivotally connecting one of said links of each pair of links to said snowmobile for pivotal movement about a second pivot axis, and means for pivotally connecting the other of said links of each pair of links to the respective ski for pivotal movement about a third pivot axis, the improvement comprising a torsion bar extending between said suspension systems, fixing means fixing one end of said torsion bar for rotation, with one of said links of one of said pair of links about one pivot axis of said pivot axes of said one pair of links upon suspension movement of the respective ski, and fixing means fixing the other end of said torsion bar for rotation with one of said links of the other of said pair of links about the corresponding pivot axis of the other ski for rotation of said other end about said other pivot axis upon suspension movement of said other ski, said fixing means causing said torsion bar end to be rotated through substantially the same angle as said one link is pivoted.

2. In a suspension system as set forth in claim 1 wherein the front skis are steered about respective steering axes and the pairs of links transmit the steering movement from a steering arm to the respective ski.

3. In a suspension system as set forth in claim 2 wherein said one pivot axis is not the first pivot axis.

4. In a suspension system as set forth in claim 3 wherein said one pivot axis is the second pivot axis.

5. In a suspension system as set forth in claim 4 wherein the one of said pivot axes are connected to respective steering arms.

6. In a suspension system as set forth in claim 5 wherein said ends of the torsion bar are connected for rotation about said one pivot axis by respective universal joints.

7. In a suspension system as set forth in claim 6 further including a spline connection in the torsion bar for permitting changes in length during suspension and steering movement.

8. In a suspension as set forth in claim 6 wherein said universal joints each comprise a first member affixed for rotation with said one link, a second member affixed for rotation with the respective torsion bar end and a universal coupling interconnecting said members.

9. In a suspension system as set forth in claim 8 wherein said steering arms of the respective suspension systems are interconnected with each other by a tie rod, said tie rod lying on the opposite side of said steering axis of steering movement from said torsion bar.

* * * * *